(12) United States Patent
Wallace et al.

(10) Patent No.: US 12,136,122 B2
(45) Date of Patent: Nov. 5, 2024

(54) SYSTEMS AND METHODS FOR USING MACHINE LEARNING MODELS TO AUTOMATICALLY IDENTIFY AND COMPENSATE FOR RECURRING CHARGES

(71) Applicant: Capital One Services, LLC, McLean, VA (US)

(72) Inventors: Christopher Wallace, Frisco, TX (US); Grant Eden, San Francisco, CA (US); Brian Barr, Schenectady, NY (US); Samuel Sharpe, Cambridge, MA (US); Anh Truong, Champaign, IL (US); Austin Walters, Columbia, TN (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/947,216

(22) Filed: Sep. 19, 2022

(65) Prior Publication Data

US 2023/0013086 A1    Jan. 19, 2023

Related U.S. Application Data

(63) Continuation of application No. PCT/CN2021/121724, filed on Sep. 29, 2021.

(30) Foreign Application Priority Data

Oct. 19, 2020    (CN) .......................... 202011119603.5

(51) Int. Cl.
*G06Q 40/02*    (2023.01)
*G06F 9/451*    (2018.01)
(Continued)

(52) U.S. Cl.
CPC ............. *G06Q 40/02* (2013.01); *G06F 9/451* (2018.02); *G06F 16/211* (2019.01);
(Continued)

(58) Field of Classification Search
CPC ........ G06Q 40/02; G06N 3/045; G06N 3/044; G06N 3/08
See application file for complete search history.

(56) References Cited

U.S. PATENT DOCUMENTS 7,577,604 B2    8/2009    Ogilvie
8,315,929 B2   11/2012    Allen-Rouman et al.
(Continued)

*Primary Examiner* — Scott C Anderson
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a method and system for automated incremental payments. The system may identify recurring charges from historical account data. Based on the recurring charges and an incremental period, the system may calculate an incremental amount and expected amount. At each iteration of the incremental period, the incremental amount may be assigned to a savings bucket. The value of the savings bucket may be subtracted from an actual account balance to calculate a reduced account balance. The system may generate and transmit a graphical user interface to a user device showing the reduced account balance. The system may receive current data containing a charge that corresponds to the recurring charges. The system may reduce the value of the savings bucket by the amount of the current data charge. If the current data charge is different from the expected amount, the system may adjust the incremental amount accordingly.

20 Claims, 4 Drawing Sheets

(51) Int. Cl.
    *G06F 16/21*     (2019.01)
    *G06F 16/22*     (2019.01)
    *G06F 16/2453*     (2019.01)
    *G06N 3/044*     (2023.01)
    *G06N 3/045*     (2023.01)
    *G06N 3/08*     (2023.01)

(52) U.S. Cl.
    CPC ...... *G06F 16/2282* (2019.01); *G06F 16/2453* (2019.01); *G06N 3/044* (2023.01); *G06N 3/045* (2023.01); *G06N 3/08* (2013.01)

(56) References Cited

U.S. PATENT DOCUMENTS

| | | | |
|---|---|---|---|
| 10,402,910 | B1 | 9/2019 | Kunz et al. |
| 10,776,877 | B2 * | 9/2020 | Biemer ................ G07C 5/008 |
| 11,004,083 | B2 * | 5/2021 | Meredith ............. G06Q 20/42 |
| 11,233,396 | B1 * | 1/2022 | Yee ................ H02J 13/00034 |
| 2009/0063332 | A1 | 3/2009 | Tabaczynski et al. |
| 2010/0306095 | A1 | 12/2010 | Olson et al. |
| 2012/0179605 | A1 | 7/2012 | Blain et al. |
| 2014/0200930 | A1 * | 7/2014 | Zizzamia ............. G16H 50/50 705/4 |
| 2021/0125109 | A1 * | 4/2021 | Handler .............. G06Q 50/12 |
| 2021/0125274 | A1 * | 4/2021 | Coluby ............... G06Q 40/02 |
| 2021/0390545 | A1 * | 12/2021 | Martinez-Guarneros ............... G06Q 20/407 |
| 2022/0188943 | A1 * | 6/2022 | Krug ................. G06Q 10/067 |
| 2022/0229980 | A1 * | 7/2022 | Jin ..................... G06N 3/044 |

\* cited by examiner

SYSTEMS AND METHODS FOR USING MACHINE LEARNING MODELS TO AUTOMATICALLY IDENTIFY AND COMPENSATE FOR RECURRING CHARGES

The disclosed technology relates to systems and methods to utilize machine learning models to identify recurring charges and compensate for those charges by creating automated incremental payments. The disclosed technology may utilize machine learning models to distinguish recurring charges from one-time charges even if the charges are irregular. Specifically, this disclosed technology relates to analyzing a user's payments (e.g., on a monthly basis), selecting a certain portion of money to set aside for use on the payments, and then showing the user a modified balance that reflects the total balance less the amount set aside.

BACKGROUND

Budgeting is an important part of financial literacy. People want and need to know how much money is in their account before making purchases. Often people are paid on a biweekly schedule, and bills are due on a monthly schedule. However, the two times may not line up. Some people, after receiving a paycheck, and seeing the according increase in account balance, can accidently overspend and not have enough money left over for regular monthly bills and expenses, which can have negative financial consequences. Therefore, people have to pay close attention to their account to know how much money they have for spending and how much money they need to pay bills.

Accordingly, there is a need for improved systems and methods to aid people in understanding how much money they have available to spend and how much they need to pay bills. Embodiments of the present disclosure are directed to this and other considerations.

SUMMARY

Disclosed embodiments may include a system for automated incremental payments. The system may include one or more processors, and memory in communication with the one or more processors and storing instructions that, when executed by the one or more processors, are configured to cause the system to provide for automated incremental payments. The system may receive historical data associated with a user. The system may also identify, using a first machine learning model, a set of recurring charges from the historical data. The system may calculate an incremental amount based on an incremental period and the set of recurring charges, wherein the incremental amount multiplied by the incremental period is an expected amount. Furthermore, the system may assign, at each iteration of the incremental period, the incremental amount to a savings bucket comprising a value. Additionally, the system may generate a graphical user interface for displaying a reduced balance equal to an actual balance minus the value of the savings bucket. The system may also transmit the graphical user interface to a user device. The system may receive current data. Furthermore, the system may extract a second amount from the current data. The system may also determine, using a second machine learning model, that the second amount corresponds to the set of recurring charges. Finally, the system may reduce the value of the savings bucket by the second amount.

Disclosed embodiments may include a system for automated incremental payments. The system may include one or more processors, and memory in communication with the one or more processors and storing instructions that, when executed by the one or more processors, are configured to cause the system to provide for automated incremental payments. The system may receive historical data associated with a user. The system may also identify, using a first machine learning model, a set of recurring charges from the historical data. Additionally, the system may calculate a first incremental amount based on an incremental period and the set of recurring charges, wherein the first incremental amount multiplied by the incremental period is an expected amount. Furthermore, the system may assign, at each iteration of the incremental period, the first incremental amount to a savings bucket comprising a value. The system may calculate a reduced balance equal to an actual balance minus the value of the savings bucket. The system may also receive new data. The system may additionally extract a second amount from the new data. Furthermore, the system may determine, using a second machine learning model, that the second amount corresponds to the set of recurring charges. Additionally, the system may determine whether the second amount is different from the expected amount. In response to determining that the second amount is different from the expected amount, the system may: adjust the first incremental amount based on the second amount and change the value of the savings bucket and the reduced balance based on the second amount and the expected amount.

Disclosed embodiments may include a system for automated incremental payments. The system may include one or more processors, and memory in communication with the one or more processors and storing instructions that, when executed by the one or more processors, are configured to cause the system to provide for automated incremental payments. The system may receive historical data associated with a user. The system may also transmit, to a user device, a prompt asking the user to select one or more sets of recurring charges and an incremental period. Furthermore, the system may receive, from the user device, a selection of a first set of recurring charges and a first incremental period. Additionally, the system may calculate a first incremental amount based on the first incremental period and the first set of recurring charges. The system may assign, at each iteration of the first incremental period, the first incremental amount to a first savings bucket comprising a first value. The system may also generate a first graphical user interface for displaying a reduced balance equal to an actual balance minus the first value of the first savings bucket. Furthermore, the system may transmit the first graphical user interface to the user device. Additionally, the system may receive current data. The system may also extract a second amount from the current data. The system may determine that the second amount corresponds to the first set of recurring charges. Finally, the system may reduce the first value of the first savings bucket by the second amount.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
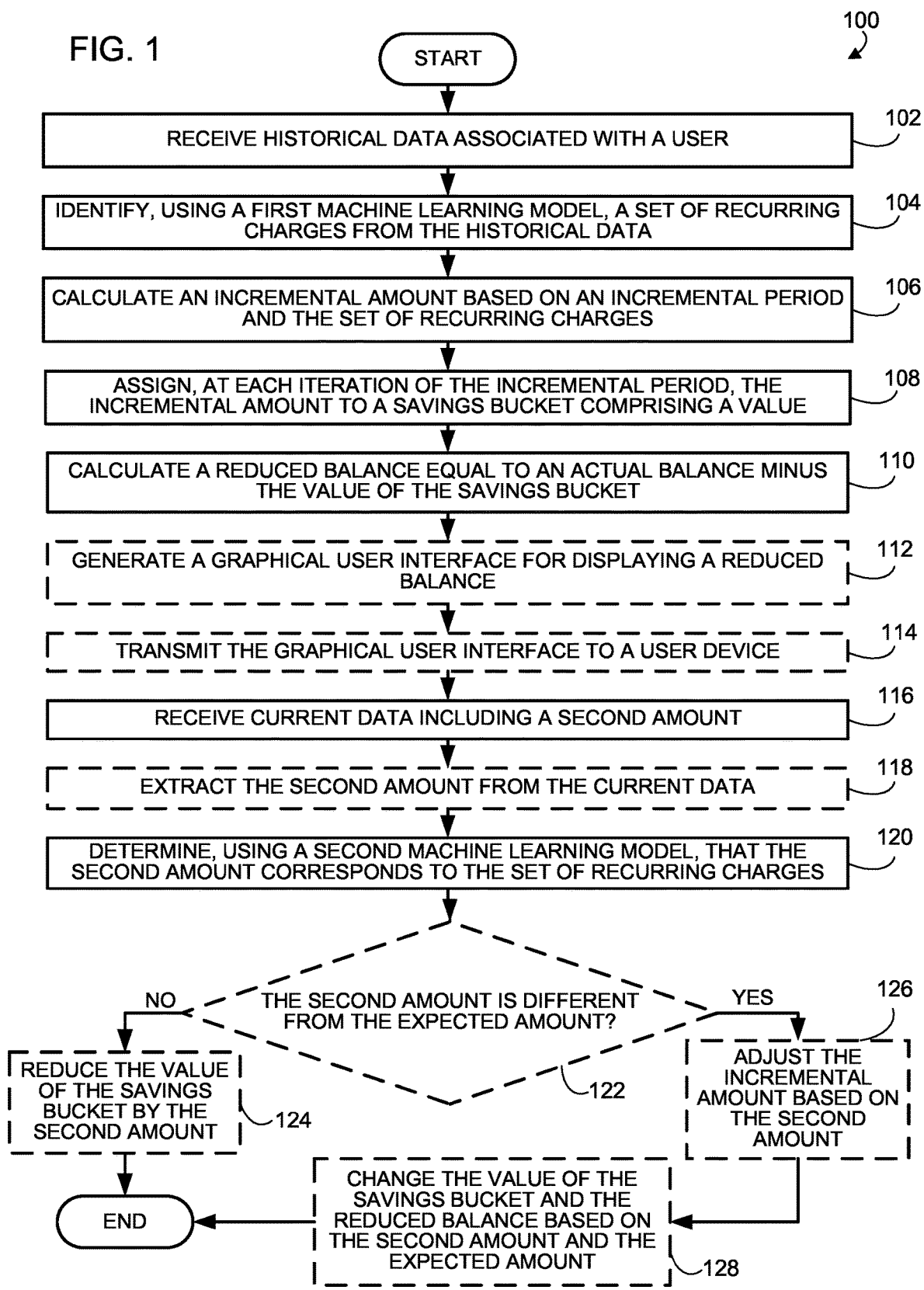
FIG. 1 is a flow diagram illustrating an exemplary method for automated incremental payments in accordance with certain embodiments of the disclosed technology.

Traditional systems and methods for budgeting are deficient in multiple ways. For example, traditional budgeting systems fail to identify reoccurring or historical expenses proactively and adequately (e.g., bills charged to an account). Such systems may also fail to set aside money from an available account balance based on a known expense without setting aside money in a new or additional account. Examples of the present disclosure relate to systems and methods for generating automated incremental payments. This results from detecting or identifying recurring charges using machine learning models. Once the charges are detected, the system can then generate an appropriate amount to compensate for the charge, which can be broken up over a time interval (e.g., a month) and subtracted from the shown account balance on each of the intervals. By using this system, the user is shown an account balance less projected expenditures (recurring charges), and, therefore, has a more accurate idea of the amount of money they can spend. The system may also be used to compensate for recurring credits or income.

More particularly, the disclosed technology relates to identifying recurring charges and creating an account balance that calculates and subtracts for these recurring charges over a given time. The systems and methods described herein utilize, in some instances, machine learning models, which are necessarily rooted in computers and technology. Machine learning models are a unique computer technology that involves training models to complete tasks and make decisions. The present disclosure details a machine learning model that identifies recurring charges from a user's account history. This, in some examples, may involve using historical user spending input data and a recurrent neural network (RNN), such as a long short-term memory (LSTM) machine learning model, applied to analyzing certain aspects of the input data, and designed to output a result of which charges are repetitive or recurring. Using a machine learning model in this way may allow the system to predict which charges are repetitive on a monthly or yearly basis, even if the amounts are not the same each time. This is a clear advantage and improvement over prior technologies that require a user to select charges to categorize because it takes the user time to manually select each repetitive charge and often the user fails to adequately account for charges that are not identical over a given period. The system may also use a machine learning model to constantly scan the account and reassess for new or changing recurring charges and make active predictions for changing the estimated account balance. The present disclosure solves this problem of user-selected charges by using machine learning models in novel and unique ways to automatically select the appropriate charges for the user that are recurring and automatically calculate an estimated balance that compensates for the recurring charges to give users a better idea of how much spending money they actually have.

The systems and methods described herein utilize, in some instances, graphical user interfaces, which are necessarily rooted in computers and technology. Graphical user interfaces are a computer technology that allows for user interaction with computers through touch, pointing devices, or other means. The present disclosure details a constantly changing account balance. This, in some examples, may involve constantly calculating an estimated balance that accounts for monthly expenditures and dynamically changing the graphical user interface so that it reflects an updated estimated balance. Using a graphical user interface in this way may allow the system to keep the user informed of how much money he has after accounting for bills and other monthly expenditures. This is a clear advantage and improvement over prior technologies that just let a user see his regular account balance because seeing a higher account balance could mistake the user into thinking he has excess funds to spend. Furthermore, examples of the present disclosure may also improve the speed with which computers can select recurring charges from a plethora of charges. Overall, the systems and methods disclosed have significant practical applications in the budgeting field because of the noteworthy improvements of the estimated balance that accounts for monthly expenditures, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for automated incremental payments, in accordance with certain embodiments of the disclosed technology. The steps of method 100 may be performed by one or more components of the system 400 (e.g., data designation system 320 or web server 410 of incremental payment system 408 or user device 402), as described in more detail with respect to FIGS. 3 and 4.

In block 102, the data designation system 320 may receive data associated with a user. The data may be historical data or account data may be bank account or credit account information. This may include data about a user associated with the account, such as the user's name, address, account number, the length of time the account has been open, birthday, interests, hobbies, among other items. The data may include information about specific charges from merchants including the name of the merchant, the address of the merchant and other location information, such as where the headquarters of a merchant is, merchant category information, merchant store information, timing information, such as date or time of a transaction, and the transaction amount. The data may also include certain information about the transaction, such as items or services purchased and the cost of individual items.

In block 104, the data designation system 320 may identify or recognize certain charges as "recurring charges" from the data. Recurring charges may include charges for a user that happen on a regular or semi-regular basis. Recurring charges may cover various aspects of a person's spending habits and be tied to typical monthly charges that most people have to unique personal charges that are specific to the user. For example, typical charges that occur on a monthly basis include utilities such as power/electric, gas, internet service, garbage, water, sewer, rent or mortgage, subscription services (e.g., for music or television), and car payments. Other charges that may be recurring but may or may not be on a monthly basis include homeowner association/condo association fees, insurance, toll fees, and transportation services. Some recurring charges may be specific to the user such as meals (e.g., if the user eats out regularly on Friday), or entertainment (e.g., if the user goes regularly to a movie on Sunday). Recurring charges do not need to be the same amount each month or period (e.g., the user's power bill may vary and be higher in summer months where air conditioning use increases the price than in winter months where the bill may be lower).

The charges may be identified by one or more multiple machine learning models, which may operate independently or together if more than one. The machine learning models may be recurrent neural networks (RNN) or long short-term memory machine learning models, which may be stateful. The machine learning model may be an ensemble of stateful long short-term memory neural networks. The machine learning model may be a forecasting model based on a current state. The machine learning models could be specifically tailored to identifying certain recurring charges, such as those for a particular geographical location, or charges that only occur during a certain time (e.g., additional charges that always occur during the user's birthday or snowblowing services every January). The machine learning models may not all be of the same type.

To identify the recurring charges, the machine learning model(s) may use a variety of data inputs. For more simple charges, the machine learning model may look for charges that come from the same merchant or merchant category, or source on a consistent date each month, each year, or each quarter or at a consistent time in a certain period (e.g., the user's power bill is charged on the $24^{th}$ of each month). The machine learning model may look for charges that are a consistent amount each month (e.g., the user's cell phone charge is consistently $84.23 per month, or the user's rent is consistently $1,700 per month). The machine learning model may detect that some charges are from the same merchant and are the same amount each month. Some charges may be detected by the machine learning model quarterly, every four months, every six months, yearly, or other time periods (e.g., the user's car insurance may be charged quarterly, or the user's homeowner association fees may be charged annually or every two years) by looking at charges over longer time frames. The machine learning model may be trained to predict charges for a certain user after being trained by data from other users (e.g., user X and 500 others like user X had a charge of $100 every 3 months from ABC insurance company, and user Y has two charges of $90 from ABC insurance company 3 months apart, therefore, it is likely that user Y will also have a charge of $90 every 3 months from ABC insurance company). The machine learning model may also be able to detect longer situations that span over years (e.g., purchases from a baby store in 2020 implies that a cell phone charge for an additional phone and line for the child will likely be occurring in 2030). The machine learning model may be trained by a user's own charges if they are different than the predicted amount. The machine learning model may adjust the incremental amount based on yearly cycles that affect balance trends. The user may be able to modify the charges or the frequency detected by the machine learning model. The user may also be able to restrict the machine learning model to only analyze certain purchase categories.

In block 106, the data designation system 320 may calculate an incremental amount based on an incremental period and the recurring charges. The recurring charges may be summed into a total or may be separate for each charge. For example, if the user has monthly charges for a car payment ($300), rent ($650), and an internet bill ($50), the user's total recurring charges would be $1000. The amount for individual recurring charges added to the total may be the same amount paid in prior months (e.g., particularly for charge amounts that do not change) or may be different from the amount charged each month. The amount added to the total may be an average over a certain number of months prior or may be an amount determined by a machine learning model based on trends detected in block 104 (e.g., a variable power bill). In some embodiments, the user may be able to choose which recurring charges to include in the total recurring charges. The user may also be able to set a certain amount for each charge different from prior or predicted amounts.

The incremental period may be a set time over which the incremental amount is to be split over. The incremental period may be each day in a month, each month in a year, or each day in a year, among other options. For example, using the above total recurring charges of $1000 per month, the incremental period may be each day in a month of 30 days. Therefore, with an incremental period of one day each month and total recurring charges of $1000, the incremental amount would be $1000 divided by the 30 days of a month. Therefore, the incremental amount would be $33.33. The incremental amount may be rounded to the nearest whole cent or the nearest whole dollar. The incremental period may change to coordinate with the calendar (e.g., using 31 days in a 31-day month). The incremental period may be set by the data designation system 320 automatically or by the user. The incremental period may be different for some charges over others.

The incremental amount multiplied by the incremental period may be an expected charge amount. The expected charge amount may be what data designation system 320 expects the amount of the charge to be in the next month. The expected amount may be calculated from all the prior recurring charges in the historical data (e.g., the user's cell phone bill has been $83.42, for the past 6 months, therefore the expected amount is $83.42). Alternatively, the expected amount may be determined by a machine learning model (e.g., the user's power bill varies, but based on last year's power bill for this month and bill trends for this year relative to last year, the expected amount is $138.42). The machine learning model may selectively eliminate certain charges that are believed to be outliers or erroneous (e.g., if the user's phone bill is consistently $83.42, but the user bought a phone last month for $800, making the bill $883.42, the machine learning model may exclude the $883.42 charge when calculating the expected amount). The machine learning model may dynamically change the incremental amount and or expected amount as a result of new data input. The machine learning model may increase the incremental amount to "catch-up" to the new expected amount in light of new data input.

The machine learning model may adjust the incremental amount based on periodic cycles that affect balance trends. This may apply to longer-term cycles. For example, the data designation system 320 may recognize that yearly cycle balance trends of the user are not equivalent to the expected amount (e.g., power bill is 50% higher than normal over the last 3 months compared to last year). The data designation system 320 may actively begin to compensate by adding or subtracting an additional amount to the incremental amount to compensate for an increase or decrease in expected amount (e.g., the data designation system 320 recalculates that the power bill has $50 higher than the normal $100 price, and then adds 50% more to the incremental amount to attempt to compensate). If the data designation system 320 calculates that the expected amount does not cover the forecasted balance trends, the data designation system 320 may generate and transmit a graphical user interface to a user device that contains a warning to the user that the incremental amount that has been assigned to the savings bucket may not cover the new expected amount. This may be an alert that the user can see when they view their reduced balance or actual balance. The alert may accompany a request for the user to increase the incremental amount or an option for the user to increase the incremental amount manually.

In block 108, the data designation system 320 may assign the incremental amount to a savings bucket at each iteration of the incremental period. A savings bucket may exist within the user's account. The savings bucket may be a flag, a category, and/or a label. The savings bucket may have a value, which may be the total value of the amount assigned to the savings bucket. The savings bucket may be named by the data designation system 320 or by the user. At each iteration of the incremental period (e.g., each day), the incremental amount may be assigned to the savings bucket. In the above example, $33.33 would be assigned on each day to the savings bucket. The value of the savings bucket may be the cumulative value of all of the incremental amounts. For example, if on April 1, $33.33 was assigned to the savings bucket, the value of the savings bucket would be $33.33. On April 3, the value of the savings bucket would be $99.99 ($33.33 for April 1 plus $33.33 for April 2 plus $33.33 for April 3). The incremental amount may be assigned to the savings bucket at any time of day. The incremental amount may be assigned to the savings bucket at the earliest time in the day (12:01 AM). Alternatively, some incremental amounts may be assigned to savings bucket at the beginning of a month. The user may be able to control when the incremental amount is moved to the savings bucket.

There may be multiple savings buckets. The multiple savings buckets may correspond to multiple different incremental periods with multiple different associated charges. For example, one incremental period, incremental amount, and savings bucket may be associated with charges that are to be spread to each day over a month. Another incremental period, incremental amount, and savings bucket may be associated with charges that are to be spread to each month over a year.

If the data designation system 320 calculates that the incremental amount is more than the reduced balance (calculated in block 110), the system may generate and transmit a graphical user interface to the user device indicating that the incremental amount cannot be assigned to the savings bucket because the reduced balance would become negative. The message may also be generated if the reduced balance falls below a certain preset value. The preset value may be set by the user or by data designation system 320. If the data designation system 320 calculates that the incremental amount cannot be assigned to the savings bucket, it may try to assign an additional amount to compensate on the next increment or after a preset time period. Alternatively, the data designation system 320 may detect when the reduced balance has a sufficient balance to assign the incremental amount to the savings bucket and complete the assignment at that time.

In block 110, the data designation system 320 may calculate a reduced account balance. The reduced account balance may be an estimate or estimated balance. The reduced balance may be equal to the actual balance of the account minus the value of the savings bucket. The account of the user typically has a balance of all the deposits minus the credits, which is referred to as the actual account balance. The reduced account balance reflects the amount that the user has (the actual account balance) minus the value of the savings bucket (or in the case of multiple savings buckets, minus the value of each savings bucket). This way the user, if they look at the reduced account balance, can tell how much money they actually have available to spend when accounting for their "use" of recurring charges during the time period. In the above example, if the user's actual account balance was $800, then on April 3, the reduced balance would be $700.

If a user withdraws more money than is reflected by the reduced balance, the savings bucket may show a deficit and assignments of incremental amounts to the savings bucket may be paused until an adequate actual balance is restored to the account. This may be accompanied by graphical user interface warnings transmitted to the user device. Once the actual account balance is restored to enough, the deficit of the savings bucket may be automatically assigned back to the savings bucket and assignment of incremental amounts to the savings bucket may automatically resume.

In optional block 112, the data designation system 320 may generate a graphical user interface to display the reduced account balance. The graphical user interface may be an online, mobile banking platform, or mobile application. The graphical user interface may display the reduced balance as the main context of how much money the user has. The graphical user interface may also display the actual account balance. The graphical user interface may have an indication that the balance reflected is the reduced balance (e.g., an animation, highlighted or bolded/underlined/italicized text). The graphical user interface may allow the user to scroll over or click the reduced balance to see the actual balance and/or the value of the savings bucket. The graphical user interface may dynamically update the reduced balance on a rolling basis (e.g., if the incremental period is every day, at 12:01 AM, the graphical user interface may change to reflect the additional amount being added to the value of savings bucket and subtract from the reduced balance accordingly).

In optional block 114, the data designation system 320 may transmit the graphical user interface to a user device. The graphical user interface may be viewable on a variety of user devices including a computer, a smartphone using a mobile web browser or mobile application, a smartwatch or other devices.

In block 116, the data designation system 320 may receive current data including a second amount. The current data may be a charge associated with the user to the user's account. The current data may include the same data as the historical account data. The current data may include a merchant, merchant location, an amount, or a merchant category.

In optional block 118, the data designation system 320 may extract the second amount from the current data. The amount may be associated with a charge from a specific merchant. Optional block 118 may be completed by a second machine learning model in block 120.

In block 120, the data designation system 320 may determine that the second amount corresponds to one or more recurring charges. The determination may be completed by a machine learning model. The machine learning model may be similar to the machine learning models in block 104. The data designation system 320 may use the current data and the second amount to determine that the current data and second amount correspond to one or more charges in the historical data that was identified as recurring charges. The second amount may be different from the amount of the recurring charges (e.g., a power bill may be $120 in April, but $150 in May). The data designation system 320 may match the second amount to the associated recurring charge. There may be a plurality of second amounts to match with a plurality of recurring charges.

In optional block 122, the data designation system 320 may determine whether the second amount is different from the expected amount of the recurring charges. This block may also be completed by the machine learning model in block 120. When data designation system 320 determines that the current data and second amount corresponds to a recurring charge, it may further check to see the difference between the second amount from the recurring charge and the expected amount. If there is no difference between the expected amount (and thus the amount that was incrementally assigned into the savings bucket over the incremental period, the expected amount, was equal to the second amount charged for the matching recurring charge), then the data designation system 320 continues to block 124. If there is a difference in the second amount from the recurring charge and the expected amount, then the data designation system 320 continues to block 126. In some embodiments, the system may not consider whether the current charge matches to the expected amount and continue directly from block 120 to block 124.

In optional block 124, the data designation system 320 may subtract the second amount from the value of the savings bucket. The reduced account balance may not change as a result of the second charge being applied to the account. Because of this, it may appear to the user that the charge associated with the second amount was already paid for. This gives the user a more accurate mental picture of how many funds they have available for spending after compensating for monthly and yearly charge obligations.

In optional block 126, the data designation system 320 may adjust the incremental amount based on the second amount. This path acts as a correction system to make sure the amount kept in the savings bucket matches the amount of the recurring charges. The incremental amount (and, therefore, the expected amount) may be adjusted based on the second amount. For example, if the expected amount of the consistent phone bill was $83.42, and the user changed to a more premium service that increased the bill to $99.98, the data designation system 320 may adjust the incremental amount by a second amount to cover the additional $16.56. Because of this, the next incremental amount may be more accurate, and the amount in the savings bucket will cover the charge more accurately. The expected and incremental amounts may be adjusted by a machine learning model. The machine learning model may use the feedback of the different second amount to predict recurring charges and expected amounts more accurately. The second amount may be used to train machine learning models. The user may be able to adjust the expected and incremental amounts manually.

In optional block 128, the data designation system 320 may change the value of the savings bucket and the reduced balance based on the second amount and the expected amount. This block effectively corrects for any amount that was assigned to the savings bucket that was in excess of the actual amount charged (the second amount) or removes additional budget out of the reduced balance to compensate if the amount assigned to the savings bucket does not adequately reflect the actual amount charged (second amount). In the above example where the user upgraded their phone service to a more premium product, the data designation system 320 has a discrepancy between the expected amount (and therefore, the amount in the savings bucket) and the amount of the charge. Therefore, data designation system 320 will subtract $83.42 from the value of the savings bucket (the original expected amount) and additionally subtract $16.56 from the reduced balance to rectify the additional amount for the charge. If the reverse scenario occurs, for example, if the user changed to a cheaper phone product that only cost $65.89, the data designation system subtracts the full $65.89 from the value of the savings bucket. Furthermore, the additional $17.53 that was in the savings bucket from the higher expected charge is subtracted from the savings bucket and added to the reduced balance because the money is available to spend.

The above paragraph reflects a balance rectification method executed on a per charge basis. Other methods to rectify the expected amount (and therefore in the value of the savings bucket) and the actual amount charge (the second amount) may be used. For example, the balance rectification could occur at a certain time (e.g., the second amount may always be subtracted from the value of the savings bucket and the balances are rectified on a periodic time schedule). Other rectification methods may be used (e.g., subtracting the necessary amount from the reduced balance if the charge comes before the full expected amount has been collected over the course of the period, and increasing the amount in the reduced balance if an expected charge is never billed).

After the second amount is paid, the data designation system 320 may indicate on a graphical user interface transmitted to the user device that the second amount was paid from the savings bucket. The indication may be a symbol, a highlight, underlined, bold, or italicized text, or a graphic or animation.

Figure 2:
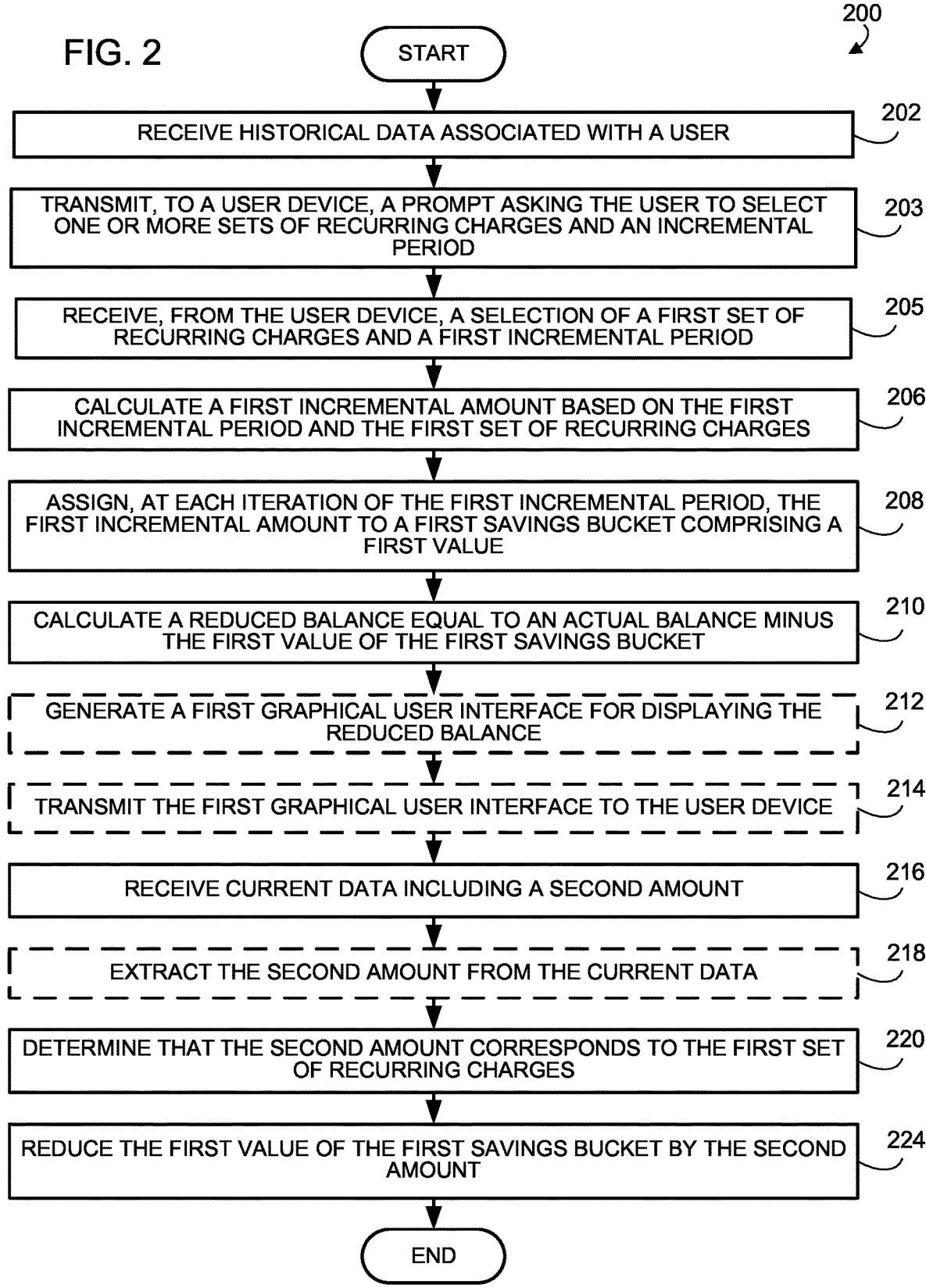
FIG. 2 is a flow diagram illustrating an exemplary method for automated incremental payments in accordance with certain embodiments of the disclosed technology.

FIG. 2 is a flow diagram illustrating an exemplary method 200 for automated incremental payments, in accordance with certain embodiments of the disclosed technology. The steps of method 200 may be performed by one or more components of the system 400 (e.g., data designation system 320 or web server 410 of incremental payment system 408 or user device 402), as described in more detail with respect to FIGS. 3 and 4.

Method 200 of FIG. 2 is similar to method 100 of FIG. 1, except that method 200 may not include blocks 104, 122, 126 or 128 of method 100. The descriptions of blocks 202, 206, 208, 210, 212, 214, 216, 218, 220, and 224 in method 200 are similar to the respective descriptions of blocks 102, 106, 108, 110, 112, 114, 116, 118, 120, and 124 of method 100 and are not repeated herein for brevity. Additional blocks 203 and 205 are also described below. Some steps of method 200 may be incorporated into method 100. Accordingly, some steps of method 100 may be incorporated into method 200.

In block 203, the data designation system 320 may transmit, to a user device, a prompt that asks the user to select a recurring charge and select an incremental period. Block 203 may involve the generation of a graphical user interface containing a list of charges that the user can scroll through and select to be recurring charges. The data designation system 320 may suggest that certain charges are recurring charges. The data designation system 320 may suggest an expected amount for each recurring charge or all recurring charges together. The data designation system 320 may suggest an incremental amount or an incremental period. The user may be able to select the recurring charges by highlighting the charges or by placing a check in a check box associated with each charge. Furthermore, the graphical user interface may allow the user to select an incremental period (e.g., daily for charges that are monthly). The graphical user interface may be transmitted to a user device.

In block 205, the data designation system 320 may receive a selection of recurring charges and an incremental period. The different selections of recurring charges may be associated with different incremental periods. Furthermore, the recurring charges may be broken up by the user into categories. Each category may have a specific incremental period or incremental amount. The user may be able to choose an incremental amount different from what is suggested by data designation system 320.

The data designation system 320 may also be used with financial card accounts to estimate a monthly total bill for the card. This information may be used in association with a bank account to reserve a portion of funds for a savings bucket associated with the financial card and its expected charge amount.

Figure 3:
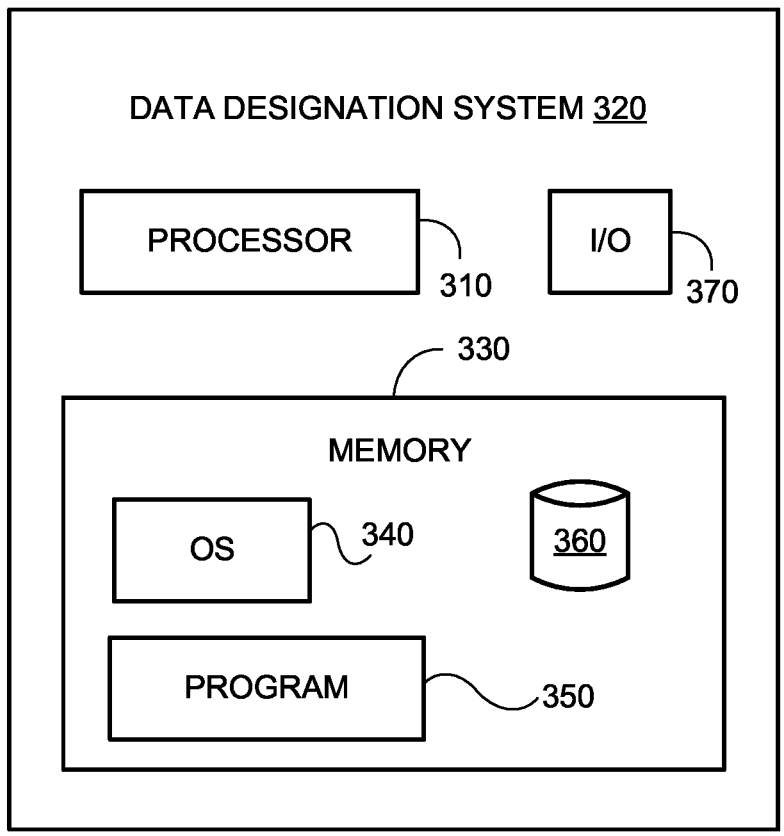
FIG. 3 is block diagram of an example data designation system used to provide for automated incremental payments, according to an example implementation of the disclosed technology.
Figure 4:
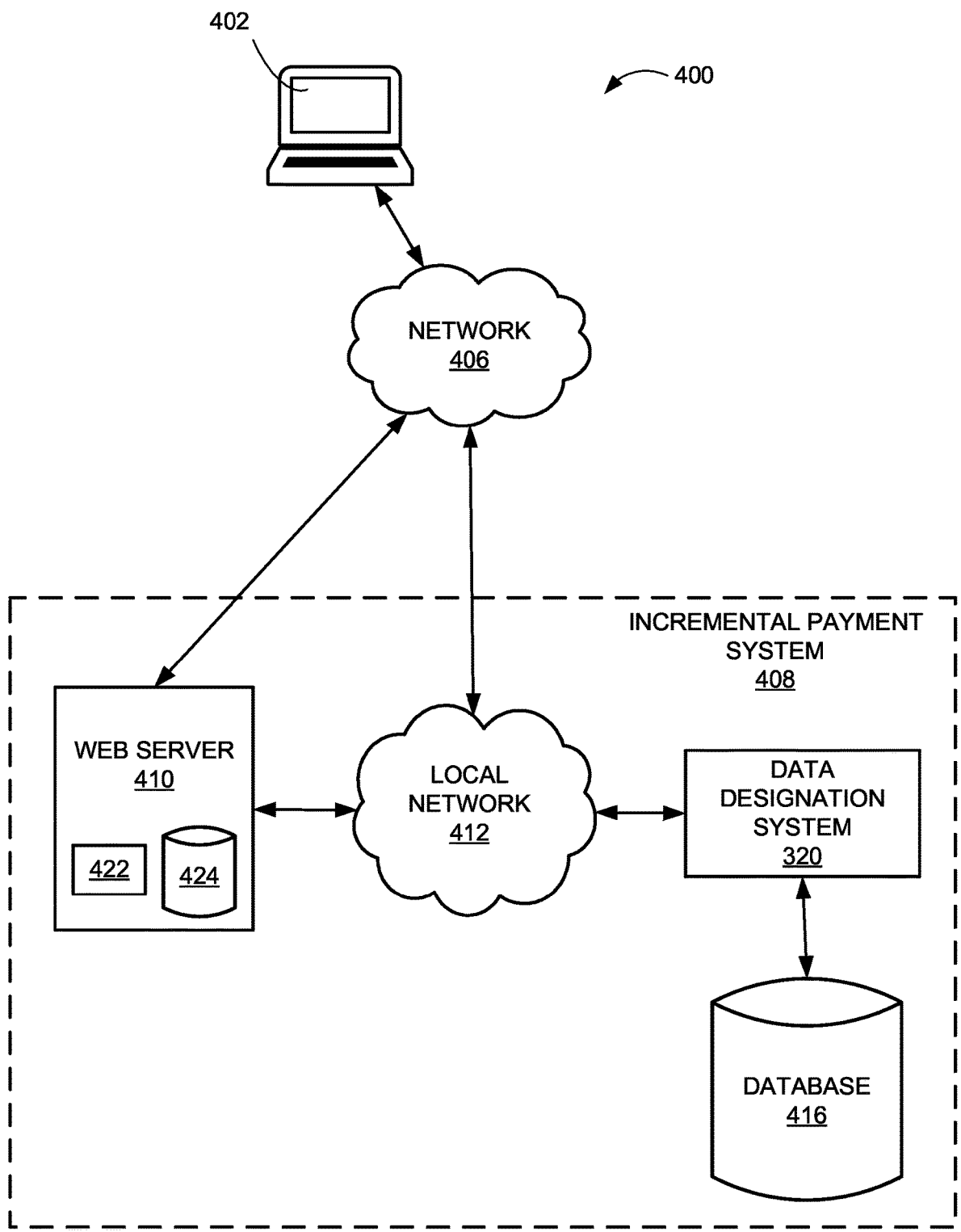
FIG. 4 is block diagram of an example system that may be used to provide for automated incremental payments, according to an example implementation of the disclosed technology.

FIG. 3 is a block diagram of an example data designation system 320 used to identify recurring charges and change an estimated account balance according to an example implementation of the disclosed technology. According to some embodiments, the user device 402 and web server 410, as depicted in FIG. 4 and described below, may have a similar structure and components that are similar to those described with respect to data designation system 320 shown in FIG. 3. As shown, the data designation system 320 may include a processor 310, an input/output (I/O) device 370, a memory 330 containing an operating system (OS) 340 and a program 350. In certain example implementations, the data designation system 320 may be a single server or may be configured as a distributed computer system including multiple servers or computers that interoperate to perform one or more of the processes and functionalities associated with the disclosed embodiments. In some embodiments data designation system 320 may be one or more servers from a serverless or scaling server system. In some embodiments, the data designation system 320 may further include a peripheral interface, a transceiver, a mobile network interface in communication with the processor 310, a bus configured to facilitate communication between the various components of the data designation system 320, and a power source configured to power one or more components of the data designation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the data designation system 320 may include one or more storage devices configured to store information used by the processor 310 (or other components) to perform certain functions related to the disclosed embodiments. In one example, the data designation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The data designation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the data designation system 320 may include the memory 330 that may include one or more programs 350 to perform one or more functions of the disclosed embodiments. For example, in some embodiments, the data designation system 320 may additionally manage dialogue and/or other interactions with the customer via a program 350.

The processor 310 may execute one or more programs 350 located remotely from the data designation system 320. For example, the data designation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a data designation system database 360 for storing related data to enable the data designation system 320 to perform one or more of the processes and functionalities associated with the disclosed embodiments.

The data designation system database 360 may include stored data relating to status data (e.g., average session duration data, location data, idle time between sessions, and/or average idle time between sessions) and historical status data. According to some embodiments, the functions provided by the data designation system database 360 may also be provided by a database that is external to the data designation system 320, such as the database 416 as shown in FIG. 4.

The data designation system 320 may also be communicatively connected to one or more memory devices (e.g., databases) locally or through a network. The remote memory devices may be configured to store information and may be accessed and/or managed by the data designation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The data designation system 320 may also include one or more I/O devices 370 that may comprise one or more interfaces for receiving signals or input from devices and providing signals or output to one or more devices that allow data to be received and/or transmitted by the data designation system 320. For example, the data designation system 320 may include interface components, which may provide interfaces to one or more input devices, such as one or more keyboards, mouse devices, touch screens, track pads, trackballs, scroll wheels, digital cameras, microphones, sensors, and the like, that enable the data designation system 320 to receive data from a user (such as, for example, via the user device 402).

In examples of the disclosed technology, the data designation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The data designation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The data designation system 320 may be configured to adjust model parameters during training. Model parameters may include weights, coefficients, offsets, or the like. Training may be supervised or unsupervised.

The data designation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The data designation system 320 may be configured to optimize statistical models using known optimization techniques.

Furthermore, the data designation system 320 may include programs configured to retrieve, store, and/or analyze properties of data models and datasets. For example, data designation system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The data designation system 320 may include algorithms to determine a data type, key-value pairs, row-column data structure, statistical distributions of information such as keys or values, or other property of a data schema may be configured to return a statistical profile of a dataset (e.g., using a data-profiling model). The data designation system 320 may be configured to implement univariate and multivariate statistical methods. The data designation system 320 may include a regression model, a Bayesian model, a statistical model, a linear discriminant analysis model, or other classification model configured to determine one or more descriptive metrics of a dataset. For example, data designation system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The data designation system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, data designation system 320 may be configured to generate a similarity metric representing a measure of similarity between data in a dataset. A similarity metric may be based on a correlation, covariance matrix, a variance, a frequency of overlapping values, or other measure of statistical similarity.

The data designation system 320 may be configured to generate a similarity metric based on data model output, including data model output representing a property of the data model. For example, data designation system 320 may be configured to generate a similarity metric based on activation function values, embedding layer structure and/or outputs, convolution results, entropy, loss functions, model training data, or other data model output). For example, a synthetic data model may produce first data model output based on a first dataset and produce second data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The data designation system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The data designation system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, data designation system 320 is configured to generate and/or train a classification model to classify a dataset, consistent with disclosed embodiments.

The data designation system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the data designation system may analyze information applying machine-learning methods.

While the data designation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the data designation system 320 may include a greater or lesser number of components than those illustrated.

FIG. 4 is a block diagram of an example system that may be used to view and interact with incremental payment system 408, according to an example implementation of the disclosed technology. The components and arrangements shown in FIG. 4 are not intended to limit the disclosed embodiments as the components used to implement the disclosed processes and features may vary. As shown, incremental payment system 408 may interact with a user device 402 via a network 406. In certain example implementations, the incremental payment system 408 may include a local network 412, a data designation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the incremental payment system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the incremental payment system 408. According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The incremental payment system 408 may be associated with and optionally controlled by one or more entities such as a business, corporation, individual, partnership, or any other entity that provides one or more of goods, services, and consultations to individuals such as customers. In some embodiments, the incremental payment system 408 may be controlled by a third party on behalf of another business, corporation, individual, partnership. The incremental payment system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that is authenticated by the data designation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the incremental payment system 408 to interact with one another and to connect to the network 406 for interacting with components in the system 400 environment. In some embodiments, the local network 412 may include an interface for communicating with or linking to the network 406. In other embodiments, certain components of the incremental payment system 408 may communicate via the network 406, without a separate local network 406.

The incremental payment system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access incremental payment system 408 using the cloud computing environment. User device 402 may be able to access incremental payment system 408 using specialized software. The cloud computing environment may eliminate the need to install specialized software on user device 402.

In accordance with certain example implementations of the disclosed technology, the incremental payment system 408 may include one or more computer systems configured to compile data from a plurality of sources the data designation system 320, web server 410, and/or the database 416. The data designation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Although the preceding description describes various functions of a web server 410, a data designation system 320, a database 416, and agent device 440 in some embodiments, some or all of these functions may be carried out by a single computing device.

EXAMPLE USE CASE

The following example use case describes an example of a typical user flow pattern. This section is intended solely for explanatory purposes and not in limitation.

In one example, John has several recurring charges: a car payment for $500 billed monthly, a television subscription service billed monthly for $25, insurance billed quarterly for $400, and a power bill that is billed monthly and varies but averaged $100 in April last year as well as numerous other non-recurring charges. Data designation system 320 receives all of John's historical data for the past three years. Data designation system 320 identifies that the car payment is a recurring charge because it is billed for the same amount each month and is from the same merchant. Similarly, data designation system 320 identifies that the television subscription service, and insurance are recurring charges for similar reasons. While the power bill is a different amount each month, the data designation system 320 identifies that the bill is from the same merchant each time and because of other user training data, understands that the merchant, Pine Creek Electric, is a utility.

The data designation system 320 asks John on his user device if he would like to create a savings bucket for these recurring charges and recommends an incremental period of each day in a month. John selects that he would like to create the savings bucket and agrees with the incremental period. The data designation system 320 receives this information and calculates an expected amount of $725 (all of the amounts plus one-fourth of the amount for the insurance) for April. Since April is a 30-day month, the data designation system 320 calculates the incremental amount to be $24.17 per day ($725 divided by 30). On April $1^{st}$, at 12:01 AM, the data designation system assigns $24.17 of John's original $800 actual account balance to the savings bucket. When John looks at his account balance on April $2^{nd}$, he sees his reduced account balance as $751.66. John selects his reduced account balance and sees that his actual account balance is $800, and the savings bucket contains $48.34. On April $30^{th}$, John's savings bucket contains $725.

On May $4^{th}$, John pays a bill for his car payment for $500. The data designation system 320 recognizes this corresponds to the recurring charge and subtracts the amount from the savings bucket. John sees an indication that the amount was paid out of the funds assigned to the savings bucket. On May $5^{th}$, John pays his television subscription service bill for $35, which included a $10 upcharge for no advertisements. The data designation system 320 recognizes that the bill, despite having the higher amount corresponds to the recurring charge. The data designation system 320 subtracts $25 from the savings bucket and $10 from the reduced account balance. Because other users frequently upgrade to the $35 plan, the data designation system 320 assigns a new expected amount to the television subscription service for $35. To compensate for the first five days of May assigning only $0.81 for the television subscription service to the savings bucket, the remaining days in May increase to $1.19 (($35−(5*0.81))/26) so that the savings bucket has $35 allocated for the television subscription service by the end of May. The system calculates that the incremental amount in June will be $1.13 ($35/30).

On May $14^{th}$, John has a family emergency and withdraws all but $50 from his reduced account balance. The data designation system 320 attempts to assign the incremental amount associated with the insurance charge on May $15^{th}$, but the preset rules prevent any assignments when the reduced account balance is below $50. The data designation system 320 sends an alert to John that the incremental amount ($3.33) could not be assigned to the savings bucket. Later that day, John deposits $2000 into his account. On May 16th, the data designation system assigns $6.66 to the savings bucket to compensate for the missing assignment on May 15th.

On May 18th, John pays his power bill $120 for April. The data designation system appropriately subtracts $100 from the savings bucket and $20 from the reduced balance. Since John's power bill has been 20% higher for each of the last 3 months, the system allocates a 20% higher expected amount for May and raises the incremental amount accordingly.

In some examples, disclosed systems or methods may involve one or more of the following clauses:

Clause 1: An incremental data designation system comprising: one or more processors; and memory in communication with the one or more processors and storing instructions that, when executed by the one or more processors, are configured to cause the system to: receive historical data associated with a user; identify, using a first machine learning model, a set of recurring charges from the historical data; calculate an incremental amount based on an incremental period and the set of recurring charges, wherein the incremental amount multiplied by the incremental period is an expected amount; assign, at each iteration of the incremental period, the incremental amount to a savings bucket comprising a value; generate a graphical user interface for displaying a reduced balance equal to an actual balance minus the value of the savings bucket; transmit the graphical user interface to a user device; receive current data; extract a second amount from the current data; determine, using a second machine learning model, that the second amount corresponds to the set of recurring charges; and reduce the value of the savings bucket by the second amount.

Clause 2: The incremental data designation system of clause 1, wherein the memory comprises storing instructions that are further configured to cause the system to: determine that the second amount is different from the expected amount; and adjust, using a third machine learning model, the incremental amount based on the second amount.

Clause 3: The incremental data designation system of clause 1, wherein the memory comprises storing instructions that are further configured to cause the system to: transmit, to the user device, a prompt for the user to input the set of recurring charges and the incremental period; and receive, from the user device, an input of the set of recurring charges and the incremental period.

Clause 4: The incremental data designation system of clause 1, wherein identifying, with the first machine learning model, the set of recurring charges from the historical data is based on a location, purchases reoccurring from a same source, purchases at a same time of year, or combinations thereof.

Clause 5: The incremental data designation system of clause 1, wherein the first machine learning model and the second machine learning model are a long short-term memory neural network or an ensemble of stateful long short-term memory neural networks.

Clause 6: The incremental data designation system of clause 1, wherein identifying, using the first machine learning model, the set of recurring charges from the historical data is based on training data from other users.

Clause 7: The incremental data designation system of clause 1, wherein the historical data comprises a plurality of charges each comprising a source name, an amount, a time, and a location.

Clause 8: An incremental data designation system comprising: one or more processors; and memory in communication with the one or more processors and storing instructions that, when executed by the one or more processors, are configured to cause the system to: receive historical data associated with a user; identify, using a first machine learning model, a set of recurring charges from the historical data; calculate a first incremental amount based on an incremental period and the set of recurring charges, wherein the first incremental amount multiplied by the incremental period is an expected amount; assign, at each iteration of the incremental period, the first incremental amount to a savings bucket comprising a value; calculate a reduced balance equal to an actual balance minus the value of the savings bucket; receive new data; extract a second amount from the new data; determine, using a second machine learning model, that the second amount corresponds to the set of recurring charges; determine whether the second amount is different from the expected amount; responsive to determining that the second amount is different from the expected amount: adjust the first incremental amount based on the second amount; and change the value of the savings bucket and the reduced balance based on the second amount and the expected amount.

Clause 9: The incremental data designation system of clause 8, wherein the memory comprises storing instructions that are further configured to cause the system to: generate a first graphical user interface for displaying the reduced balance; and transmit the first graphical user interface to a user device.

Clause 10: The incremental data designation system of clause 8, wherein determining, with the second machine learning model, that the second amount corresponds to the set of recurring charges is based on a location, purchases reoccurring from a same source or purchases at a same time of year.

Clause 11: The incremental data designation system of clause 8, wherein adjusting the first incremental amount uses a third machine learning model, wherein the first incremental amount is adjusted based on periodic cycles that affect balance trends.

Clause 12: The incremental data designation system of clause 11, wherein the memory comprises storing instructions that are further configured to cause the system to: calculate that the expected amount does not cover periodic cycle balance trends of the user; and responsive to calculating that the expected amount does not cover the periodic cycle balance trends of the user: generate a second graphical user interface comprising a warning that the first incremental amount is too low; and transmit the second graphical user interface to a user device.

Clause 13: The incremental data designation system of clause 8, wherein changing the value of the savings bucket based on the second amount and the expected amount further comprises: determining whether the second amount is more than the expected amount; responsive to determining that the second amount is more than the expected amount: reducing the value of the savings bucket by the expected amount; reducing the reduced balance by a first difference of the second amount and the expected amount; responsive to determining that the second amount is not more than the expected amount: reducing the value of the savings bucket by the second amount; and increasing the reduced balance by a second difference of the expected amount and the second amount.

Clause 14: The incremental data designation system of clause 8, wherein the memory comprises storing instructions that are further configured to cause the system to: calculate that the first incremental amount is more than the reduced balance; and responsive to calculating that the first incremental amount is more than the reduced balance: generate a third graphical user interface comprising a warning that the reduced balance is too low to assign the first incremental amount to the savings bucket; and transmit the third graphical user interface to a user device.

Clause 15: An incremental data designation system comprising: one or more processors; and memory in communication with the one or more processors and storing instructions that, when executed by the one or more processors, are configured to cause the system to: receive historical data associated with a user; transmit, to a user device, a prompt asking the user to select one or more sets of recurring charges and an incremental period; receive, from the user device, a selection of a first set of recurring charges and a first incremental period; calculate a first incremental amount based on the first incremental period and the first set of recurring charges; assign, at each iteration of the first incremental period, the first incremental amount to a first savings bucket comprising a first value; generate a first graphical user interface for displaying a reduced balance equal to an actual balance minus the first value of the first savings bucket; transmit the first graphical user interface to the user device; receive current data; extract a second amount from the current data; determine that the second amount corresponds to the first set of recurring charges; and reduce the first value of the first savings bucket by the second amount.

Clause 16: The incremental data designation system of clause 15, wherein the first set of recurring charges are identified from the historical data by a first machine learning model.

Clause 17: The incremental data designation system of clause 15, wherein determining that the second amount corresponds to the first set of recurring charges is completed by a second machine learning model.

Clause 18: The incremental data designation system of clause 15, wherein the memory comprises storing instructions that are further configured to cause the system to: receive, from the user device, a second incremental period and a second set of the recurring charges; calculate a second incremental amount based on the second incremental period and the second set of the recurring charges; and assign, at each iteration of the second incremental period, the second incremental amount to a second savings bucket comprising a second value.

Clause 19: The incremental data designation system of clause 18, wherein the memory comprises storing instructions that are further configured to cause the system to: generate a second graphical user interface for displaying the reduced balance equal to the actual balance minus the first value of the first savings bucket and the second value of the second savings bucket; and transmit the second graphical user interface to the user device.

Clause 20: The incremental data designation system of clause 18, wherein the memory comprises storing instructions that are further configured to cause the system to: extract a third amount from the current data; determine that the third amount corresponds to the second set of the recurring charges; and reduce the second value of the second savings bucket by the third amount.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions.

Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An incremental data designation system comprising:
one or more processors; and
memory in communication with the one or more processors and storing instructions that, when executed by the one or more processors, are configured to cause the system to:
receive historical data associated with a user;
train, using training data comprising historical data associated with other users, a first machine learning model to predict charges for the user;
identify, using the first machine learning model, a set of recurring charges from the historical data associated with the user;
monitor, by the first machine learning model, an account associated with the user to update the set of recurring charges in response to identifying new or changing recurring charges;
calculate an incremental amount based on an incremental period and the set of recurring charges, wherein the incremental period is a predetermined period of time comprising a predetermined number of discrete time increments and the incremental amount multiplied by the incremental period is an expected amount;
assign, at each successive time increment of the predetermined number of discrete time increments of the incremental period, the incremental amount to a savings bucket comprising a value;
generate a graphical user interface for displaying a reduced balance equal to an actual balance minus the value of the savings bucket;
transmit the graphical user interface to a user device;
receive current data;
extract a second amount from the current data;
determine, using a second machine learning model, that the second amount corresponds to the set of recurring charges; and
reduce the value of the savings bucket by the second amount.

2. The incremental data designation system of claim 1, wherein the memory comprises storing instructions that are further configured to cause the system to:
determine that the second amount is different from the expected amount; and
adjust, using a third machine learning model, the incremental amount based on the second amount.

3. The incremental data designation system of claim 1, wherein the memory comprises storing instructions that are further configured to cause the system to:
transmit, to the user device, a prompt for the user to input the set of recurring charges and the incremental period; and
receive, from the user device, an input of the set of recurring charges and the incremental period.

4. The incremental data designation system of claim 1, wherein identifying, with the first machine learning model, the set of recurring charges from the historical data is based on a location, purchases reoccurring from a same source, purchases at a same time of year, or combinations thereof.

5. The incremental data designation system of claim 1, wherein the first machine learning model and the second machine learning model are a long short-term memory neural network or an ensemble of stateful long short-term memory neural networks.

6. The incremental data designation system of claim 1, wherein the historical data comprises a plurality of charges each comprising a source name, an amount, a time, and a location.

7. The incremental data designation system of claim 1, wherein the memory comprises storing instructions that are further configured to cause the system to:
dynamically modify the graphical user interface to display a modified reduced balance at each iteration of the incremental period.

8. An incremental data designation system comprising:
one or more processors; and
memory in communication with the one or more processors and storing instructions that, when executed by the one or more processors, are configured to cause the system to:
receive historical data associated with a user;
train, using training data comprising historical data associated with other users, a first machine learning model to predict charges for the user;
identify, using the first machine learning model, a set of recurring charges from the historical data associated with the user, wherein the first machine learning model is trained;
monitor, by the first machine learning model, an account associated with the user to update the set of recurring charges in response to identifying new or changing recurring charges;
calculate a first incremental amount based on an incremental period and the set of recurring charges, wherein the first incremental amount multiplied by the incremental period is an expected amount and the incremental period is a predetermined period of time;
assign, at each successive time increment of a predetermined number of discrete time increments of the incremental period, the first incremental amount to a savings bucket comprising a value;
calculate a reduced balance equal to an actual balance minus the value of the savings bucket;
receive new data;
extract a second amount from the new data;
determine, using a second machine learning model, that the second amount corresponds to the set of recurring charges;
determine whether the second amount is different from the expected amount;
responsive to determining that the second amount is different from the expected amount:
adjust the first incremental amount based on the second amount; and
change the value of the savings bucket and the reduced balance based on the second amount and the expected amount.

9. The incremental data designation system of claim 8, wherein the memory comprises storing instructions that are further configured to cause the system to:
generate a first graphical user interface for displaying the reduced balance; and
transmit the first graphical user interface to a user device.

10. The incremental data designation system of claim 8, wherein determining, with the second machine learning model, that the second amount corresponds to the set of recurring charges is based on a location, purchases reoccurring from a same source or purchases at a same time of year.

11. The incremental data designation system of claim 8, wherein adjusting the first incremental amount uses a third machine learning model, wherein the first incremental amount is adjusted based on periodic cycles that affect balance trends.

12. The incremental data designation system of claim 11, wherein the memory comprises storing instructions that are further configured to cause the system to:
calculate that the expected amount does not cover periodic cycle balance trends of the user; and
responsive to calculating that the expected amount does not cover the periodic cycle balance trends of the user:
generate a second graphical user interface comprising a warning that the first incremental amount is too low; and
transmit the second graphical user interface to a user device.

13. The incremental data designation system of claim 8, wherein changing the value of the savings bucket based on the second amount and the expected amount further comprises:
determining whether the second amount is more than the expected amount;
responsive to determining that the second amount is more than the expected amount:
reducing the value of the savings bucket by the expected amount;
reducing the reduced balance by a first difference of the second amount and the expected amount;
responsive to determining that the second amount is not more than the expected amount:
reducing the value of the savings bucket by the second amount; and
increasing the reduced balance by a second difference of the expected amount and the second amount.

14. The incremental data designation system of claim 8, wherein the memory comprises storing instructions that are further configured to cause the system to:
calculate that the first incremental amount is more than the reduced balance; and
responsive to calculating that the first incremental amount is more than the reduced balance:
generate a third graphical user interface comprising a warning that the reduced balance is too low to assign the first incremental amount to the savings bucket; and
transmit the third graphical user interface to a user device.

15. An incremental data designation system comprising:
one or more processors; and
memory in communication with the one or more processors and storing instructions that, when executed by the one or more processors, are configured to cause the system to:
receive historical data associated with a user;
transmit, to a user device, a prompt asking the user to select one or more sets of recurring charges and an incremental period;
receive, from the user device, a selection of a first set of recurring charges and a first incremental period, wherein the first incremental period is a set period of time;
calculate a first incremental amount based on the first incremental period and the first set of recurring charges;
assign, at each successive time increment of a predetermined number of discrete time increments of the first incremental period, the first incremental amount to a first savings bucket comprising a first value;
generate a first graphical user interface for displaying a reduced balance equal to an actual balance minus the first value of the first savings bucket;
transmit the first graphical user interface to the user device;
receive current data;
extract a second amount from the current data;
determine that the second amount corresponds to the first set of recurring charges; and
reduce the first value of the first savings bucket by the second amount.

16. The incremental data designation system of claim 15, wherein the first set of recurring charges are identified from the historical data by a first machine learning model and the first machine learning model is trained, using training data comprising historical data associated with other users, to predict charges for the user.

17. The incremental data designation system of claim 15, wherein determining that the second amount corresponds to the first set of recurring charges is completed by a second machine learning model.

18. The incremental data designation system of claim 15, wherein the memory comprises storing instructions that are further configured to cause the system to:
receive, from the user device, a second incremental period and a second set of the recurring charges;
calculate a second incremental amount based on the second incremental period and the second set of the recurring charges; and
assign, at each iteration of the second incremental period, the second incremental amount to a second savings bucket comprising a second value.

19. The incremental data designation system of claim 18, wherein the memory comprises storing instructions that are further configured to cause the system to:
generate a second graphical user interface for displaying the reduced balance equal to the actual balance minus the first value of the first savings bucket and the second value of the second savings bucket; and
transmit the second graphical user interface to the user device.

20. The incremental data designation system of claim 18, wherein the memory comprises storing instructions that are further configured to cause the system to:
extract a third amount from the current data;
determine that the third amount corresponds to the second set of the recurring charges; and
reduce the second value of the second savings bucket by the third amount.

* * * * *